United States Patent
Outram

(10) Patent No.: US 11,121,640 B2
(45) Date of Patent: Sep. 14, 2021

(54) SYSTEMS, METHODS, AND APPARATUS FOR CONTROLLING A VOLTAGE SOURCE CONVERTER

(71) Applicant: GENERAL ELECTRIC TECHNOLOGY GMBH, Baden (CH)

(72) Inventor: John Lewis Outram, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 69 days.

(21) Appl. No.: 16/498,203

(22) PCT Filed: Mar. 20, 2018

(86) PCT No.: PCT/EP2018/057061
§ 371 (c)(1),
(2) Date: Sep. 26, 2019

(87) PCT Pub. No.: WO2018/177822
PCT Pub. Date: Oct. 4, 2018

(65) Prior Publication Data
US 2021/0104954 A1 Apr. 8, 2021

(30) Foreign Application Priority Data

Mar. 27, 2017 (EP) ..................................... 17163100

(51) Int. Cl.
*H02M 7/483* (2007.01)
(52) U.S. Cl.
CPC .......... *H02M 7/483* (2013.01); *H02M 7/4835* (2021.05)
(58) Field of Classification Search
CPC ...................... H02M 7/483; H02M 2007/4835
See application file for complete search history.

(56) References Cited

U.S. PATENT DOCUMENTS

2013/0285456 A1*  10/2013  Feuerstack ..............  B60L 58/18
                                                                  307/71
2016/0336874 A1*  11/2016  Kikuchi ............  H02M 7/53871
2018/0138826 A1*   5/2018  Jimichi ....................  H02M 1/32

OTHER PUBLICATIONS

Khan Naveed Ahmad et al. "Hybrid Nearest Level and open loop control modular multilevel converters", 2014 16th European Conference on Power Electronics and Applications, IEEE, Aug. 26, 2014, pp. 1-12.

(Continued)

*Primary Examiner* — Peter M Novak
(74) *Attorney, Agent, or Firm* — Eversheds Sutherland (US) LLP

(57) ABSTRACT

A method of controlling a voltage source converter including at least one converter limb, each converter limb including limb portions, at least one limb portion including a chain-link converter having modules, each module including at least one switching element and at least one energy storage device, which combine to selectively provide a voltage source, comprising the steps of: establishing during an operating cycle of the chain-link converter a utilization peak based on the actual peak number of modules providing a voltage source; establishing a target utilization based on a desired number of modules providing a voltage source during the operating cycle; and determining a control function based on a difference between the established utilization peak and the target utilization which alters the peak number of modules providing a voltage source during a subsequent operating cycle of the chain-link converter so as to drive the utilization peak towards the target utilization.

10 Claims, 5 Drawing Sheets

(56) References Cited

OTHER PUBLICATIONS

Ahmed Noman et al. "Performance of the modular multilevel converter with redundant submodules", IECON 2015—41st Annual Conference of the IEEE Industrial Electronics Society, IEEE, Nov. 9, 2015, pp. 3922-3927.
International Search Report and the Written Opinion of PCT/EP2018/057061 dated Jun. 6, 2018.
European Search Report for Application No. 17163100.5 dated Jul. 25, 2017.

* cited by examiner

SYSTEMS, METHODS, AND APPARATUS FOR CONTROLLING A VOLTAGE SOURCE CONVERTER

CROSS-REFERENCE TO RELATED APPLICATIONS

This application is a U.S. National Stage Application under 35 U.S.C. 371 and claims the priority benefit of International Application No. PCT/EP2018/057061 filed Mar. 20, 2018 which claims priority to EP17163100.5, filed Mar. 27, 2017, both of which are incorporated herein by reference.

This invention relates to a method of controlling a voltage source converter and to such a voltage source converter.

In high voltage direct current (HVDC) power transmission networks alternating current (AC) power is typically converted to direct current (DC) power for transmission via overhead lines and/or under-sea cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilized in power transmission networks where it is necessary to interconnect the DC and AC electrical networks. In any such power transmission network, converters are required at each interface between AC and DC power to effect the required conversion; AC to DC or DC to AC.

A particular type of converter is a voltage source converter which is operable to generate an AC voltage waveform at one or more AC terminals thereof in order to provide the aforementioned power transfer functionality between the AC and DC electrical networks.

According to a first aspect of the invention, there is provided a method of controlling a voltage source converter including at least one converter limb, the at least one converter limb extending between first and second DC terminals and including first and second limb portions separated by an AC terminal, and at least one limb portion including a chain-link converter having a plurality of series-connected modules, each module including at least one switching element and at least one energy storage device. The at least one switching element and the at least one energy storage device of each module combines to selectively provide a voltage source where the corresponding chain-link converter is operable to provide a stepped variable voltage source. The method of controlling a voltage source converter with respect to at least one chain-link converter comprises:

(a) establishing during an operating cycle of the chain-link converter a utilization peak based on the actual peak number of modules providing a voltage source;

(b) establishing a target utilization based on a desired number of modules providing a voltage source during an operating cycle of the chain-link converter; and (c) determining a control function based on a difference between the established utilization peak and the target utilization which alters the peak number of modules providing a voltage source during a subsequent operating cycle of the chain-link converter so as to drive the utilization peak towards the target utilization.

Driving the utilization peak towards a desired target utilization is advantageous because overly low utilization of the modules leads to each utilized module having to provide a higher individual voltage, which adversely impacts the reliability of the modules, and overly high utilization of the modules impairs the ability of the associated chain-link converter to provide an increased voltage source when necessary to maintain control of the voltage source converter.

Furthermore, achieving such desired target utilization by comparing an established utilization peak with the target utilization allows the method of the invention to apply equally to any voltage source converter installation, irrespective of its configuration and so avoids the need for extensive changes to the method for different voltage source converter installation projects.

Preferably step (c) of determining a control function which alters the peak number of modules providing a voltage source during a subsequent operating cycle of the chain-link converter includes determining a control function which modifies an operating cycle average module voltage of the modules within the chain-link converter.

Modifying the operating cycle average module voltage of the modules, i.e., the average voltage source provided by each individual utilized module during an operating cycle of the associated chain-link converter, is achieved by increasing or decreasing, as needed, the magnitude of the voltage source provided by each module. Changing the magnitude of the voltage source provided by each module directly impacts the number of modules needed for the associated chain-link converter to provide a given voltage source.

Optionally the control function is or includes a corrective current value that adjusts the current flowing through each module during an operating cycle of the chain-link converter.

Adjusting the current flowing through each module alters the magnitude of the voltage source stored by each module and so achieves the desired modification of the operating cycle average module voltage of the modules referred to above.

The corrective current value may be directly proportional to the difference between the established utilization peak and the target utilization.

Such proportional control of the corrective current is relatively simple to implement while still providing the desired modification of the operating cycle average module voltage of the modules.

In an embodiment of the invention, the corrective current value is based on a difference between a measured operating cycle average module voltage of the modules within the chain-link converter and a target average module voltage determined from the difference between the established utilization peak and the target utilization.

Determining a target average module voltage from the difference between the established utilization peak and the target utilization avoids the need to pre-calculate discrete target average voltages according to an operating point of the voltage source converter within which the associated chain-link converter is located and so frees the method of the invention from the operating constraints of a particular voltage source converter installation, while still permitting the determining of a corrective current value.

Optionally the target average module voltage is directly proportional to the difference between the established utilization peak and the target utilization.

The corrective current value may be directly proportional to the difference between the measured operating cycle average module voltage and the target average module voltage.

Such proportional control is relatively simple to implement while still ultimately providing the desired modification of the operating cycle average voltage of the modules Preferably the utilization peak is a ratio of the actual peak number of modules providing a voltage source during an operating cycle of the chain-link converter to the total number of modules available to provide a voltage source.

Such a ratio is a convenient form of characterizing the utilization peak which can be readily employed within subsequent determinations.

In another preferred embodiment of the invention the target utilization is one of:
- a predefined constant ratio; and
- a variable ratio determined according to a degree of available module redundancy in the chain-link converter.

Either of the foregoing is both a convenient form of characterizing the target utilization and one which can be straightforwardly employed in subsequent determinations.

According to a second aspect of the invention, there is provided a method of controlling a voltage source converter including a plurality of converter limbs, each converter limb extending between first and second DC terminals and including first and second limb portions separated by an AC terminal. Each limb portion can include a chain-link converter having a plurality of series-connected modules, each module including at least one switching element and at least one energy storage device, the at least one switching element and the at least one energy storage device of each module combining to selectively provide a voltage source, where the corresponding chain-link converter is operable to provide a stepped variable voltage source. The method of controlling the voltage source converter comprises:

(a) establishing during an operating cycle of each chain-link converter a respective utilization peak based on the actual peak number of modules providing a voltage source;

(b) establishing a respective target utilization for each chain-link converter based on a desired number of modules providing a voltage source during an operating cycle of the corresponding said chain-link converter;

(c) determining a respective control function for each chain-link converter based on a difference between the corresponding established utilization peak and the corresponding target utilization which alters the peak number of modules providing a voltage source during a subsequent operating cycle of the corresponding said chain-link converter so as to drive the corresponding utilization peak towards the corresponding target utilization; and (d) combining the respective control functions into a series of direct current and circulating alternating current components to manage the overall operation of the voltage source converter.

Such a method shares with it the benefits of the corresponding steps of the first aspect of the invention while extending the invention to the total control of a voltage source converter.

According to a third aspect of the invention, there is provided a voltage source converter comprising:
- at least one converter limb, the at least one converter limb extending between first and second DC terminals and including first and second limb portions separated by an AC terminal,
- at least one limb portion including a chain-link converter having a plurality of series-connected modules, each module including at least one switching element and at least one energy storage device,
- the at least one switching element and the at least one energy storage device of each module combining to selectively provide a voltage source where the corresponding chain-link converter is operable to provide a stepped variable voltage source; and
- a control unit operatively associated with at least one chain-link converter and programmed with respect to the at least one chain-link converter to:
  (a) establish during an operating cycle of the chain-link converter a utilization peak based on the actual peak number of modules providing a voltage source;
  (b) establish a target utilization based on a desired number of modules providing a voltage source during an operating cycle of the chain-link converter; and
  (c) determine a control function based on a difference between the established utilization peak and the target utilization which alters the peak number of modules providing a voltage source during a subsequent operating cycle of the chain-link converter so as to drive the utilization peak towards the target utilization.

The voltage source converter of the invention, and more particularly the control unit it comprises, shares the benefits associated with the corresponding method steps mentioned hereinabove.

There now follows a brief description of preferred embodiments of the invention, by way of non-limiting examples, with reference being made to the following figures in which.

Figure 1:
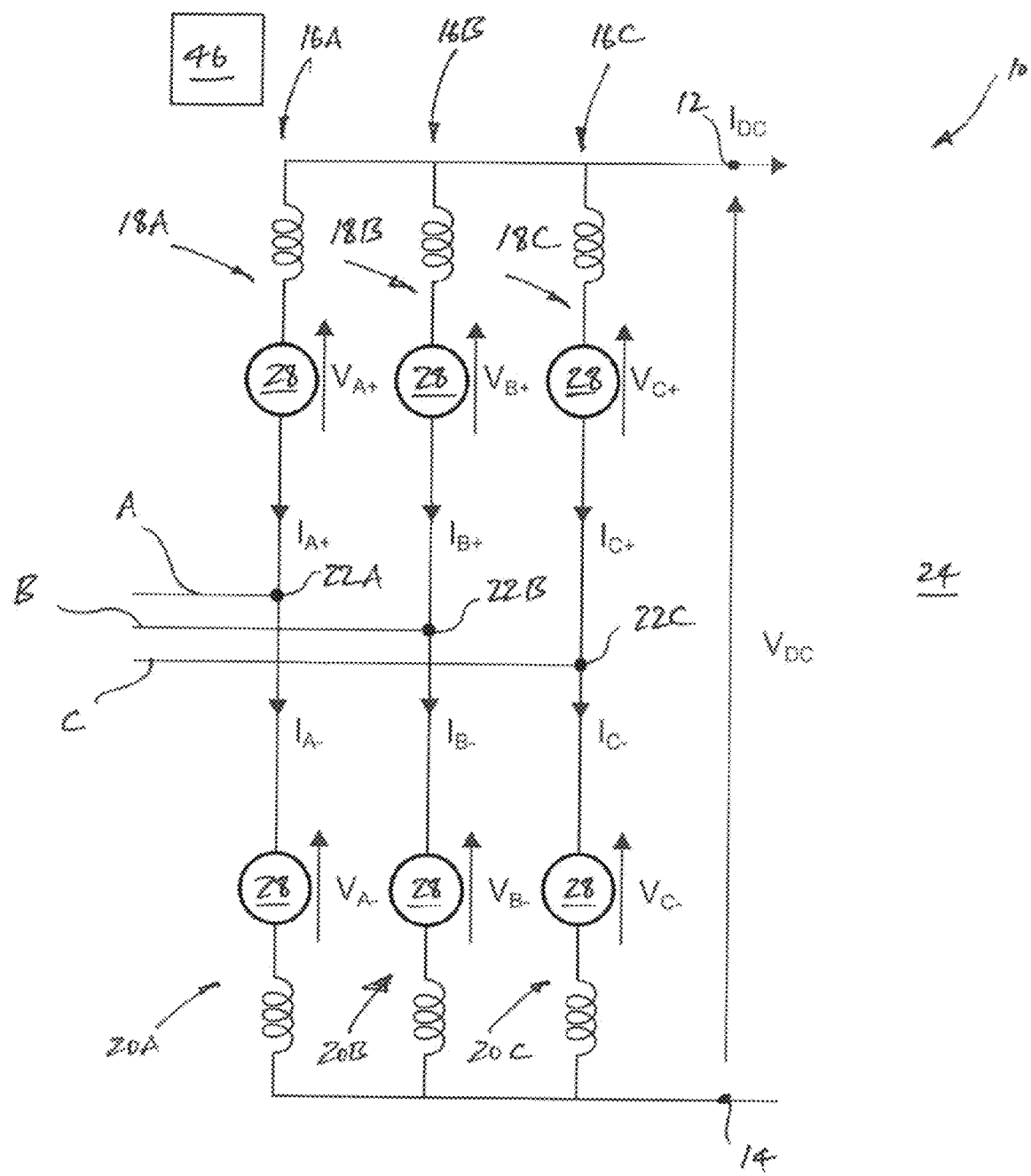
FIG. 1 shows a schematic view of a voltage source converter according to an embodiment of the invention.
Figure 4A:
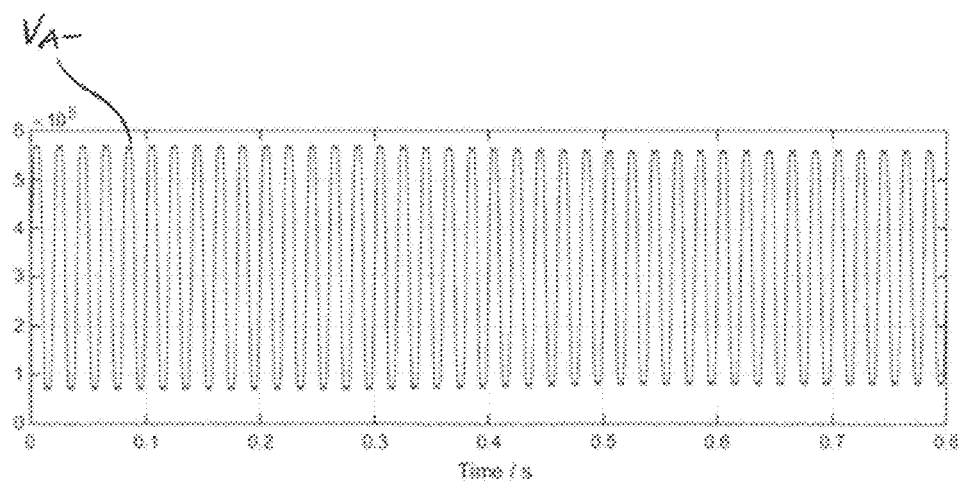
Figure 4B:
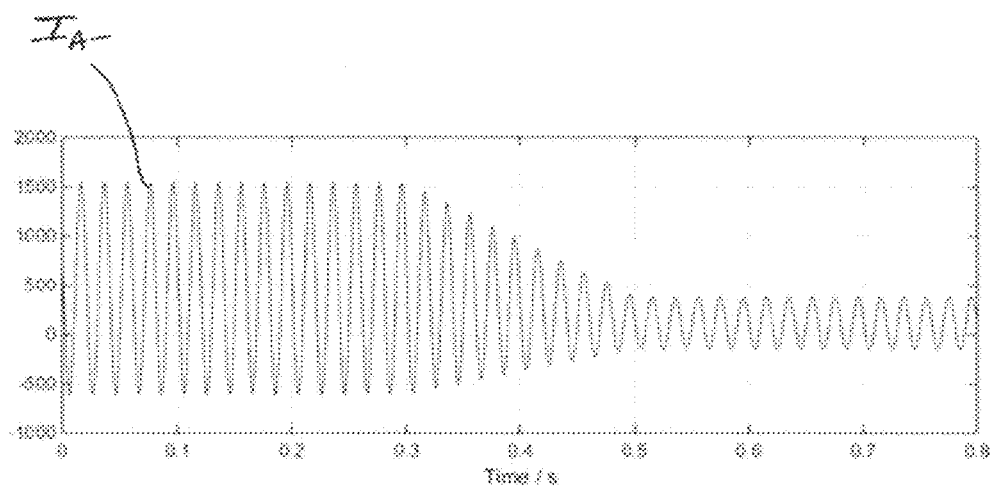
Figure 5A:
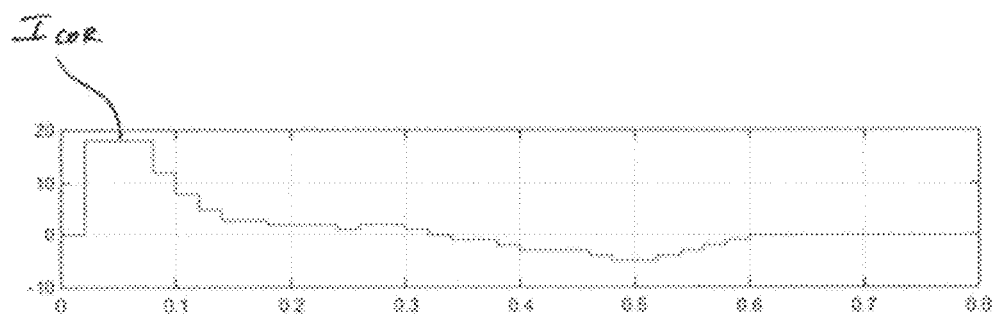
Figure 5B:
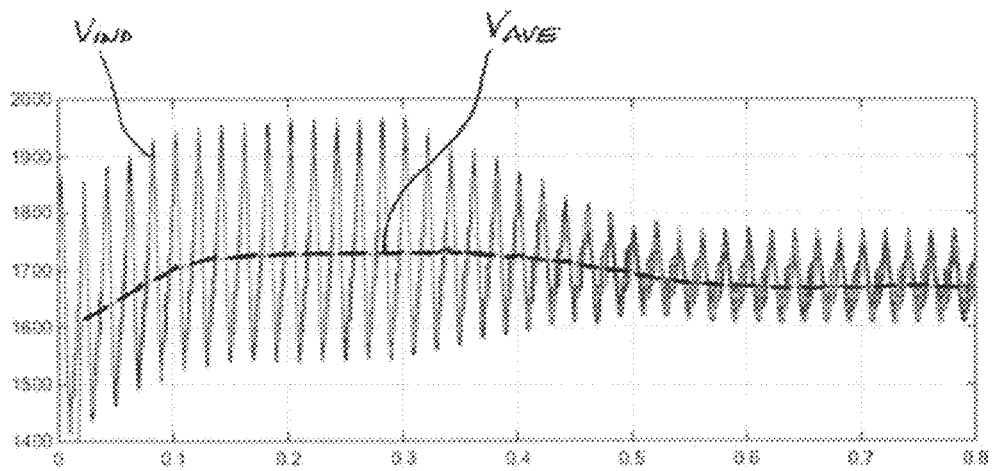
Figure 5C:
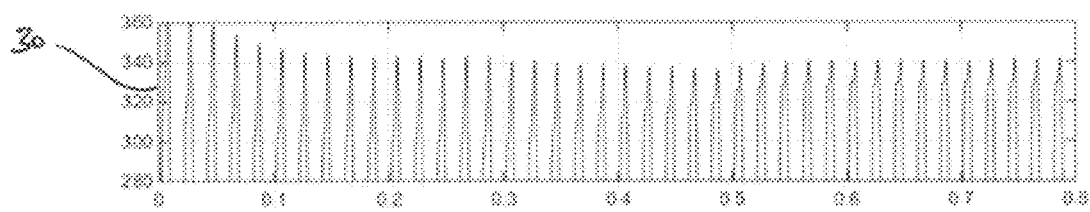
Figure 6:
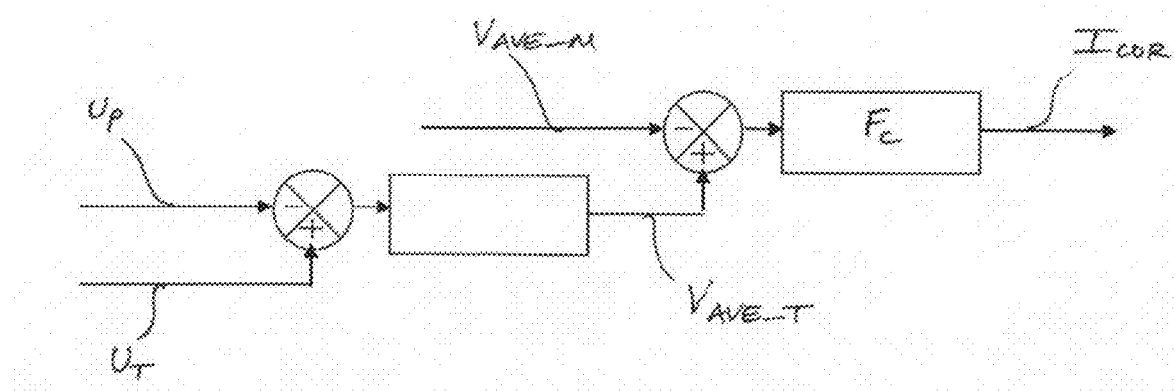
Figure 7:
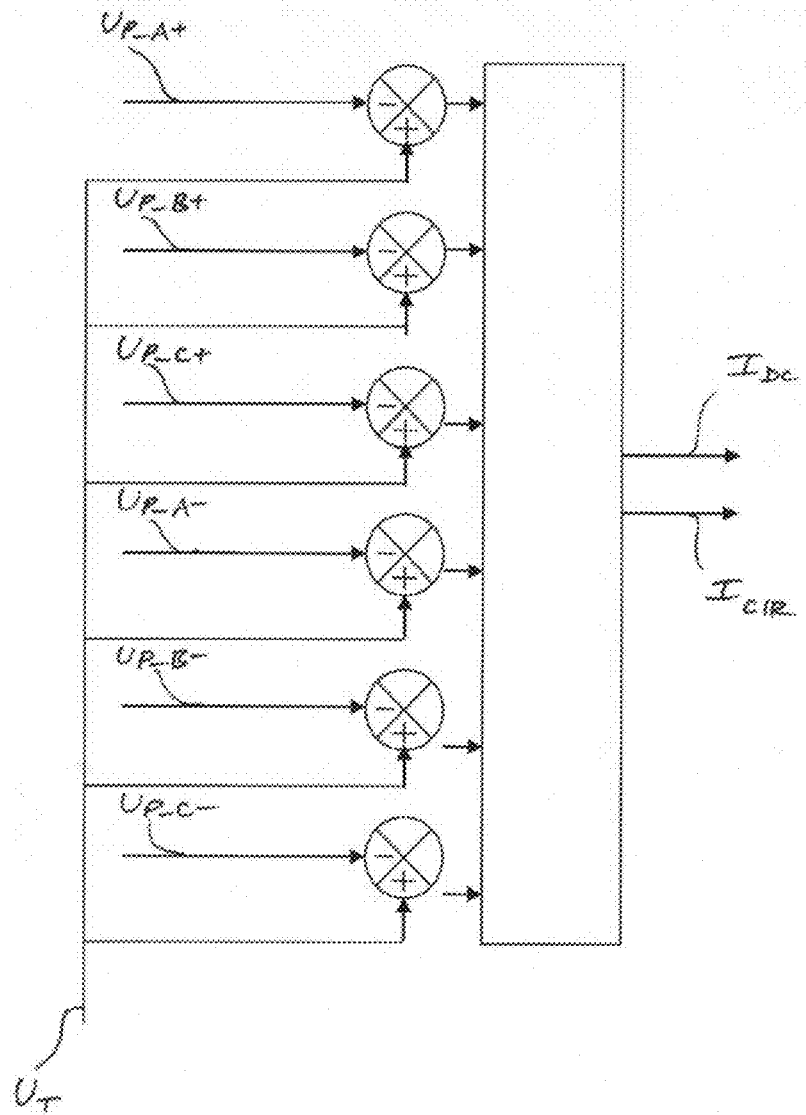

FIGS. 4(a) and 4(b) respectively show voltage and load current waveforms in a chain-link converter within a limb portion of the voltage source converter shown in FIG. 1 as the voltage source converter transitions from providing 100% power to 25% power;

FIG. 5(a) shows a corrective current value of a control function determined by the first method of the invention as the voltage source converter transitions from providing 100% power to 25% power;

FIG. 5(b) shows an operating cycle average module voltage of modules within the aforesaid chain-link converter as the voltage source converter transitions from providing 100% power to 25% power;

FIG. 5(c) shows an alteration in the peak number of modules in the said chain-link converter as the voltage source converter transitions from providing 100% power to 25% power;

FIG. 6 shows a schematic view of a second method according to the invention of controlling the voltage source converter shown in FIG. 1; and FIG. 7 shows a schematic view of a third method according to the invention of controlling the voltage source converter shown in FIG. 1.

A voltage source converter according to an embodiment of the invention is designated generally by reference numeral 10, as shown schematically in FIG. 1. The voltage source converter 10 includes first and second DC terminals 12, 14 between which extend three converter limbs 16A, 16B, 16C, each of which corresponds to a given phase of a three-phase electrical power system. In other embodiments of the invention the voltage source converter may include fewer than or more than three converter limbs.

Each converter limb 16A, 16B, 16C includes first and second limb portions 18A, 18B, 18C, 20A, 20B, 20C which are separated by a corresponding AC terminal 22A, 22B, 22C.

In use the first and second DC terminals 12, 14 are connected to a DC network 24, and the AC terminals 22A, 22B, 22C are connected to respective phases A, B, C of a three-phase AC network 26.

Each limb portion 18A, 18B, 18C, 20A, 20B, 20C includes a chain-link converter 28 which extends between the respective AC terminal 22A, 22B, 22C and a corresponding one of the first or the second DC terminals 12, 14. Each chain-link converter 28 includes a plurality of series-connected modules 30. By way of example, in the voltage source converter 10 shown each chain-link converter 28 includes three hundred and sixty modules 30, although this may differ in other embodiments of the invention.

Each module 30 includes at least one switching element 32 and at least one energy storage device 34 which combine to selectively provide a voltage source.

Figure 2A:
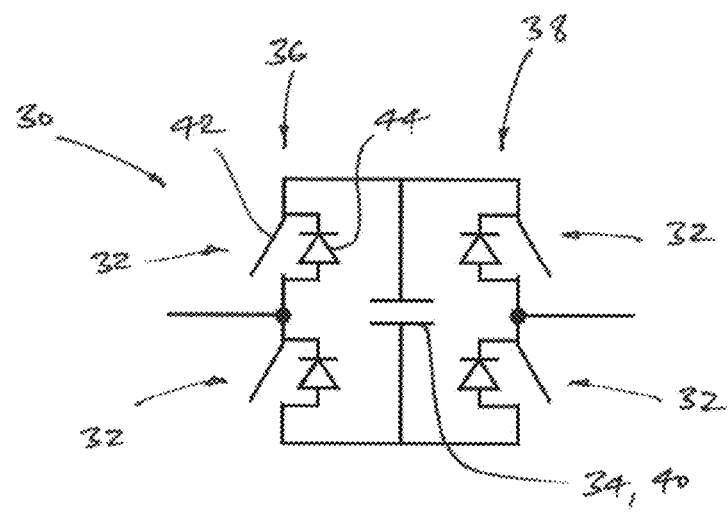
FIG. 2(a) shows a 4-quadrant bipolar sub-module which can form a part of one or more chain-link converters within the voltage source converter shown in FIG. 1.

FIG. 2(a) shows an example first module 30 in which first and second pairs 36, 38 of switching elements 32 and an energy storage device 34 in the form of a capacitor 40 (although other types of energy storage device may also be used) are connected in a known full bridge arrangement to define a 4-quadrant bipolar module. Switching of the switching elements 32 selectively directs current through the capacitor 40 or causes current to bypass the capacitor 40 such that the first module 30 can provide zero, positive or negative voltage and can conduct current in two directions.

Figure 2B:
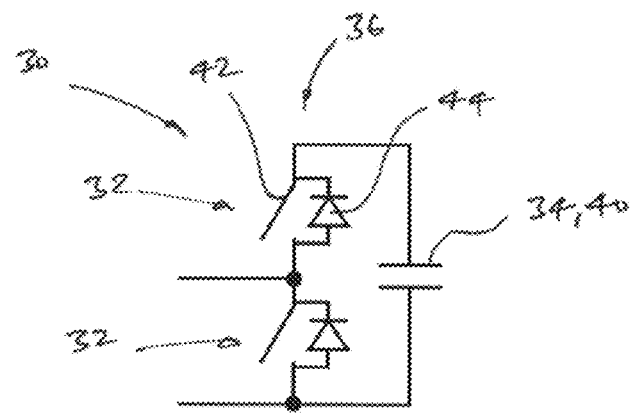
FIG. 2(b) shows a 2-quadrant unipolar sub-module which can form a part of one or more chain-link converters within the voltage source converter shown in FIG. 1.

FIG. 2(b) shows an example second module 30 in which only a first pair 36 of switching elements 32 is connected in parallel with a capacitor 40 in a known half-bridge arrangement to define a 2-quadrant unipolar module. In a similar manner to the first module 30, switching of the switching elements 32 again selectively directs current through the capacitor 40 or causes current to bypass the capacitor 40 such that the second module 30 can provide zero or positive voltage and can conduct current in two directions.

In the example modules 30 shown each switching element 32 includes a semiconductor device 42 in the form of, e.g. an Insulated Gate Bipolar Transistor (IGBT), which is connected in parallel with an anti-parallel diode 44. It is, however, possible to use other semiconductor devices.

It is possible to build up a combined voltage across each chain-link converter 28 by combining the individual voltage available from each module 30, whereby the modules 30 work together to permit the chain-link converter 28 to provide a stepped variable voltage source $V_{A+}$, $V_{B+}$, $V_{C+}$, $V_{A-}$, $V_{B-}$, $V_{C-}$. This permits the generation of a voltage waveform across each chain-link converter 28 using a step-wise approximation. Operation of each chain-link converter 28 in this manner can be used to generate an AC voltage waveform at the corresponding AC terminal 22A, 22B, 22C, and thereby enable the voltage source converter 10 to provide power transfer functionality between the DC and AC networks 24, 26.

In addition to the foregoing the voltage source converter 10 includes a control unit 46 which, in the embodiment shown, is operatively associated with the chain-link converter 28 in each limb portion 18A, 18B, 18C, 20A, 20B, 20C. In other embodiments of the invention, however, the voltage source converter may include more than one control unit, each of which may be operatively associated with a single chain-link converter or a plurality of chain-link converters.

Returning to the embodiment shown, the control unit 46 is programmed, with respect to each chain-link converter 28, to:

(a) establish during an operating cycle of each chain-link converter 28 a respective utilization peak $U_P$ based on the actual peak number of modules 30 providing a voltage source;

(b) establish a respective target utilization $U_T$ based on a desired number of modules 30 providing a voltage source during an operating cycle of the said each chain-link converter 28; and (c) determine a respective control function $F_C$ for each chain-link converter 28 based on a difference between the corresponding established utilization peak $U_P$ and the corresponding target utilization $U_T$ which alters the peak number of modules 30 providing a voltage source during a subsequent operating cycle of the corresponding said chain-link converter 28 so as to drive the utilization peak $U_P$ towards the target utilization $U_T$.

Accordingly, it follows that the control unit 46 is programmed to carry out a first method according to a further embodiment of the invention comprising the steps of:

(a) establishing during an operating cycle of each chain-link converter 28 a respective utilization peak $U_P$ based on the actual peak number of modules 30 providing a voltage source;

(b) establishing a respective target utilization $U_T$ for each chain-link converter 28 based on a desired number of modules 30 providing a voltage source during an operating cycle of the corresponding said chain-link converter 28; and (c) determining a respective control function $F_C$ for each chain-link converter 28 based on a difference between the corresponding established utilization peak $U_P$ and the corresponding target utilization $U_T$ which alters the peak number of modules 30 providing a voltage source during a subsequent operating cycle of the corresponding said chain-link converter 28 so as to drive the corresponding utilization peak $U_P$ towards the corresponding target utilization $U_T$.

For the sake of conciseness, the following passages refer in more detail to the method steps carried out by the control unit 46, i.e. the actions the control unit 46 is programmed to carry out, with respect to a single chain-link converter 28, e.g. within the second limb portion 20A of the first converter limb 16A, although the steps apply equally to the chain-link converter 28 in each of the other limb portions 18A, 18B, 18C, 20B, 20C.

More particularly, step (c) of determining a control function $F_C$ for the chain-link converter 28 based on a difference between the corresponding established utilization peak $U_P$ and the corresponding target utilization $U_T$, which alters the peak number of modules 30 providing a voltage source during a subsequent operating cycle of the chain-link converter 28, includes determining a control function $F_C$ which modifies an operating cycle average module voltage $V_{AVE}$ of the modules 30 within the chain-link converter 28, i.e. modifies the average individual voltage source provided by each individual module 30 utilized during an operating cycle of the chain-link converter 28.

Figure 3:
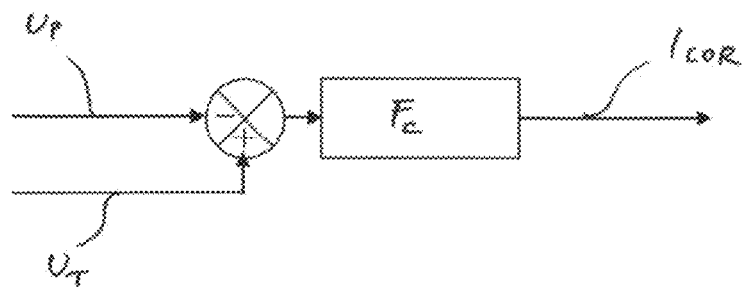
FIG. 3 shows a schematic view of a first method according to the invention of controlling the voltage source converter shown in FIG. 1.

More particularly still, the control function $F_C$ is a corrective current value $I_{COR}$ that adjusts the current flowing through each module 30 during an operating cycle of the chain-link converter 28, as illustrated schematically in FIG. 3.

In the embodiment shown, the corrective current value $I_{COR}$ is directly proportional to the difference between the established utilization peak $U_P$ and the target utilization $U_T$, although this need not necessarily be the case.

In addition, in the embodiment shown, the utilization peak $U_P$ is a ratio of the actual peak number of modules 30 providing an individual voltage source during an operating cycle of the chain-link converter 28 to the total number of modules 30 available to provide a voltage source, i.e., three hundred and sixty modules 30 in the example chain-link converter 28 shown. In this context, an operating cycle of the chain-link converter 28 is considered to be the same length as one cycle of the fundamental component of the AC voltage and current of the AC network 26.

Meanwhile, in the embodiment shown the target utilization $U_T$ is a predefined constant ratio which, by way of example is 0.95. In other words, it is desired to utilise 95% of the available modules 30, i.e., three hundred and forty-two of the total of three hundred and sixty available modules 30.

In other embodiments of the invention, the target utilization may instead be a variable ratio determined according to a degree of available module redundancy in the chain-link converter. For example, it may be desired to maintain a constant 5% degree of redundancy in the total number of modules, but the total number of available modules may decline over time as individual modules fail and become unavailable, and so the target utilization may start at 0.95 but vary, i.e. fall, as the number of available modules reduces.

Use of the first method of the invention is illustrated by way of example in connection with the voltage source converter 10 shown in FIG. 1 transitioning from transferring 100% power between the DC and AC networks 24, 26 to transferring 25% power.

FIG. 4(a) shows a voltage waveform $V_{A-}$ across the second limb portion 20A of the first converter limb 16A during the transition, and similarly FIG. 4(b) shows a load current waveform $I_{A-}$ of load current flowing through the said second limb portion 20A during the same transition. As illustrated in FIG. 4(b), at around 0.3 seconds the load current begins to reduce from 100% to 25% after around 0.5 seconds in order to effect the aforementioned reduction in power transfer from 100% to 25%.

As indicated above, the corrective current value $I_{COR}$ is directly proportional to the difference between the established utilization peak $U_P$ and the target utilization $U_T$, and more particularly is determined by multiplying the difference between the established utilization peak $U_P$ and the target utilization $U_T$ by a proportional gain which, by way of example, is −360, i.e.:

$$I_{COR}=(U_T-U_P)\times-360$$

Multiplication by the aforementioned proportional gain may be implemented, e.g. by a proportional, integral differential (PID) controller.

Assigning the proportional gain a negative value, i.e. −360, ensures that when the utilization peak $U_P$ of a previous operating cycle of the chain-link converter 128 is above the target utilization $U_T$ the resulting corrective current value $I_{COR}$ is positive, e.g., as shown between 0 and 0.1 seconds in FIG. 5(a).

A positive corrective current value $I_{COR}$ increases the current flowing through each module 30 of the chain-link converter 128 during a subsequent operating cycle, which over time has the effect of charging the capacitor 40 in each module 30, i.e. increasing the magnitude of the voltage source each module 30 is able to provide, and thereby increases the operating cycle average module voltage $V_{AVE}$ of the modules 30 within the chain-link converter 128, as shown similarly between 0 and 0.1 seconds in FIG. 5(b) (which also shows the individual voltage sources $V_{IND}$ provided by each of the modules 30 in the chain-link converter 128).

Increasing the operating cycle average module voltage $V_{AVE}$ of the modules 30 within the chain-link converter 128, in turn, reduces the number of modules 30 needed for the chain-link converter 128 to provide a given voltage source during each operating cycle, e.g. as shown between 0 and 0.1 seconds in FIG. 5(c) in which the number of modules 30 providing a voltage source reduces from three hundred and sixty to three hundred and forty-two, i.e. the desired peak number according to the predetermined target utilization $U_T$ of 0.95.

At the same time, a negative proportional gain ensures that when the utilization peak $U_P$ of a previous operating cycle of the chain-link converter 128 is below the target utilization $U_T$, the resulting corrective current value $I_{COR}$ is negative, e.g., as shown between 0.3 and 0.6 seconds in FIG. 5(a).

A negative corrective current value $I_{COR}$ reduces the current flowing through each module 30 of the chain-link converter 128 during a subsequent operating cycle, which over time has the effect of discharging the capacitor 40 in each module 30, i.e. reducing the magnitude of the voltage source each module 30 is able to provide, and thereby reduces the operating cycle average module voltage $V_{AVE}$ of the modules 30 within the chain-link converter 128, as shown similarly between 0.3 and 0.6 seconds in FIG. 5(b).

Decreasing the operating cycle average module voltage $V_{AVE}$ of the modules 30 within the chain-link converter 128, in turn, increases the peak number of modules 30 providing a voltage source during each operating cycle, e.g. as shown between 0.3 and 0.6 seconds in FIG. 5(c) in which the number of modules 30 providing a voltage source increases from below three hundred and forty-two back up to three hundred and forty-two so as to return to the desired target utilization $U_T$ of 0.95.

In another embodiment of the invention the control unit 46 may be programmed to carry out a second method according to a still further embodiment of the invention, as illustrated schematically in FIG. 6.

In the second method of the invention the control function $F_C$ determined by the control unit 46 is a corrective current value $I_{COR}$ that is based on a difference between a measured operating cycle average module voltage $V_{AVE\_M}$ of the modules within the chain-link converter and a target average module voltage $V_{AVE\_T}$ determined from the difference between the established utilization peak $U_P$ and the target utilization $U_T$.

In such a method, the target average module voltage $V_{AVE\_T}$ is directly proportional to the difference between the established utilization peak $U_P$ and the target utilization $U_T$, and the corrective current value $I_{COR}$ is in turn directly proportional to the difference between the measured operating cycle average module voltage $V_{AVE\_M}$ and the target average module voltage $V_{AVE\_T}$.

The second method of the invention otherwise has the same effect on the peak number of modules 30 providing a voltage source during a subsequent operating cycle of a given chain-link converter 128 as the first method of the invention, i.e. with a positive corrective current value $I_{COR}$ reducing the peak number of modules 30 providing a voltage source during a subsequent operating cycle and a negative corrective current value $I_{COR}$ increasing the peak number of modules 30 providing a voltage source during a subsequent operating cycle.

In a still further embodiment of the invention the control unit 46 may be programmed to carry out a third method according to yet another embodiment of the invention, as illustrated schematically in FIG. 7.

In the third method of the invention, the control unit 46 is programmed to carry out the steps of:
(a) establishing during an operating cycle of each chain-link converter 128 a respective utilization peak $U_{P\_A+}$, $U_{P\_B+}$, $U_{P\_C+}$, $U_{P\_A-}$, $U_{P\_B-}$, $U_{P\_C-}$ based on the actual peak number of modules 30 providing a voltage source;
(b) establishing a respective target utilization for each chain-link converter 128, which by way of example may be the same target utilization $U_T$ for each chain-link converter 128, based on a desired number of modules 30 providing a voltage source during an operating cycle of the corresponding said chain-link converter 128;
(c) determining a respective control function $F_C$ in the form of a respective corrective current value $I_{COR\_A+}$, $I_{COR\_B+}$, $I_{COR\_C+}$, $I_{COR\_A-}$, $I_{COR\_B-}$, $I_{COR\_C-}$ for each chain-link converter 128, based on a difference between the corresponding established utilization peak $U_{P\_A+}$, $U_{P\_B+}$, $U_{P\_C+}$, $U_{P\_A-}$, $U_{P\_B-}$, $U_{P\_C-}$ and the corresponding target utilization $U_T$, which alters the peak number of modules 30 providing a voltage source during a subsequent operating cycle of the corresponding said chain-link converter so as to drive the corresponding utilization peak $U_{P\_A+}$, $U_{P\_B+}$, $U_{P\_C+}$, $U_{P\_A-}$, $U_{P\_B-}$, $U_{P\_C-}$ towards the corresponding target utilization $U_T$; and
(d) combining the respective control functions, i.e., the respective corrective current values $I_{COR\_A+}$, $I_{COR\_B+}$, $I_{COR\_C+}$, $I_{COR\_A-}$, $I_{COR\_B-}$, $I_{COR\_C-}$, into a series of direct current and circulating alternating current components $I_{DC}$, $I_{CIR}$ to manage the overall operation of the voltage source converter 10.

The direct current and circulating alternating current components $I_{DC}$, $I_{CIR}$ are preferably expressed as vectors or matrices that contain components related to each phase A, B, C, loops between phases A, B, C formed by paths utilising positive and/or negative DC poles and different harmonics. In addition, the circulating alternating current components $I_{CIR}$ may be at harmonics of the fundamental operating frequency of the voltage source converter 10.

The third method of the invention otherwise has the same effect on the peak number of modules 30 providing a voltage source during a subsequent operating cycle of each chain-link converter 128 as the first and second methods do on a given chain-link converter 128, i.e. a positive corrective current value $I_{COR}$ with respect to an individual chain-link converter reduces the peak number of modules 30 providing a voltage source during a subsequent operating cycle and a negative corrective current value $I_{COR}$ increases the peak number of modules 30 providing a voltage source during a subsequent operating cycle.

The invention claimed is:
1. A method of controlling a voltage source converter including at least one converter limb, the at least one converter limb extending between first and second DC terminals and including first and second limb portions separated by an AC terminal, at least one of the first and the second limb portions including a chain-link converter having a plurality of series-connected modules, each of the plurality of series-connected modules including at least one switching element and at least one energy storage device, the at least one switching element and the at least one energy storage device of each module combining to selectively provide a voltage source whereby the corresponding chain-link converter is operable to provide a stepped variable voltage source, the method comprising with respect to at least one chain-link converter:
(a) establishing during an operating cycle of the chain-link converter a utilization peak based on an actual peak number of modules providing a voltage source;
(b) establishing a target utilization based on a desired number of modules providing a voltage source during an operating cycle of the chain-link converter; and
(c) determining a control function based on a difference between the established utilization peak and the target utilization which alters the peak number of modules providing a voltage source during a subsequent operating cycle of the chain-link converter so as to drive the utilization peak towards the target utilization, wherein the step of determining a control function which alters the peak number of modules providing a voltage source during a subsequent operating cycle of the chain-link converter includes determining a control function which modifies an operating cycle average module voltage of the modules within the chain-link converter.

2. The method of controlling a voltage source converter according to claim 1 wherein the control function is or includes a corrective current value that adjusts the current flowing through each module during an operating cycle of the chain-link converter.

3. The method of controlling a voltage source converter according to claim 2 wherein the corrective current value is directly proportional to the difference between the established utilization peak and the target utilization.

4. The method of controlling a voltage source converter according to claim 2 wherein the corrective current value is directly proportional to the difference between the measured operating cycle average module voltage and the target average module voltage.

5. The method of controlling a voltage source converter according to claim 2 wherein the corrective current value is based on a difference between a measured operating cycle average module voltage of the modules within the chain-link converter and a target average module voltage determined from the difference between the established utilization peak and the target utilization.

6. The method of controlling a voltage source converter according to claim 5 wherein the target average module voltage is directly proportional to the difference between the established utilization peak and the target utilization.

7. The method of controlling a voltage source converter according to claim 1 wherein the utilization peak is a ratio of the actual peak number of modules providing a voltage source during an operating cycle of the chain-link converter to the total number of modules available to provide a voltage source.

8. The method of controlling a voltage source converter according to claim 1 wherein the target utilization is one of:
a predefined constant ratio; and
a variable ratio determined according to a degree of available module redundancy in the chain-link converter.

9. A method of controlling a voltage source converter including a plurality of converter limbs, each of the plurality of converter limbs extending between first and second DC terminals and including first and second limb portions separated by an AC terminal, each of the first and the second limb portions including a chain-link converter having a plurality of series-connected modules, each of the plurality of series-connected modules including at least one switching element and at least one energy storage device, the at least one switching element and the at least one energy storage device of each module combining to selectively provide a voltage source ($V_{IND}$) whereby the corresponding chain-link converter is operable to provide a stepped variable voltage source, the method comprising:

(a) establishing during an operating cycle of each chain-link converter a respective utilization peak based on an actual peak number of modules providing a voltage source ($V_{IND}$);

(b) establishing a respective target utilization for each chain-link converter based on a desired number of modules providing a voltage source during an operating cycle of the corresponding said chain-link converter;

(c) determining a respective control function for each chain-link converter based on a difference between the corresponding established utilization peak and the corresponding target utilization which alters the peak number of modules providing a voltage source during a subsequent operating cycle of the corresponding said chain-link converter so as to drive the corresponding utilization peak towards the corresponding target utilization ($U_T$), wherein the step of determining a respective control function which alters the peak number of modules providing a voltage source during a subsequent operating cycle of the chain-link converter includes determining a respective control function which modifies an operating cycle average module voltage of the modules within the chain-link converter; and (d) combining the respective control function into a series of direct current and circulating alternating current components to manage the overall operation of the voltage source converter.

10. A voltage source converter comprising:

at least one converter limb, the at least one converter limb extending between first and second DC terminals and including first and second limb portions separated by an AC terminal, at least one of the first and the second limb portions including a chain-link converter having a plurality of series-connected modules, each of the plurality of series-connected modules including at least one switching element and at least one energy storage device, the at least one switching element and the at least one energy storage device of each module combining to selectively provide a voltage source ($V_{IND}$) whereby the corresponding chain-link converter is operable to provide a stepped variable voltage source; and a control unit operatively associated with at least one chain-link converter and programmed with respect to the at least one chain-link converter to:

(a) establish during an operating cycle of the chain-link converter a utilization peak based on an actual peak number of modules providing a voltage source;

(b) establish a target utilization based on a desired number of modules providing a voltage source during an operating cycle of the chain-link converter; and (c) determine a control function based on a difference between the established utilization peak and the target utilization which alters the peak number of modules providing a voltage source during a subsequent operating cycle of the chain-link converter so as to drive the utilization peak towards the target utilization, wherein the step of determining a control function which alters the peak number of modules providing a voltage source during a subsequent operating cycle of the chain-link converter includes determining a control function which modifies an operating cycle average module voltage of the modules within the chain-link converter.

* * * * *